(12) United States Patent
Mallan et al.

(10) Patent No.: US 7,055,637 B2
(45) Date of Patent: Jun. 6, 2006

(54) HYDRAULIC TILTING DEVICE FOR TILTING A VEHICLE CAB, AND VEHICLE PROVIDED WITH TILTING DEVICE OF THIS TYPE

(75) Inventors: Roeland Mallan, Enschede (NL); Aswin Leonard Koebrugge, Hengelo (NL)

(73) Assignee: Actuant Corporation, Glendale, WI (US)

( * ) Notice: Subject to any disclaimer, the term of this patent is extended or adjusted under 35 U.S.C. 154(b) by 311 days.

(21) Appl. No.: 10/432,447

(22) PCT Filed: Oct. 15, 2001

(86) PCT No.: PCT/NL01/00757

§ 371 (c)(1),
(2), (4) Date: May 20, 2003

(87) PCT Pub. No.: WO02/42146

PCT Pub. Date: May 30, 2002

(65) Prior Publication Data

US 2004/0045755 A1    Mar. 11, 2004

(30) Foreign Application Priority Data

Nov. 21, 2000   (NL) .................................... 1016668

(51) Int. Cl.
*B62D 33/067* (2006.01)
(52) U.S. Cl. .............................. 180/89.14; 296/190.05; 296/190.07
(58) Field of Classification Search ............. 180/89.14, 180/89.15; 296/190.01, 190.04, 190.05, 296/190.07
See application file for complete search history.

(56) References Cited

U.S. PATENT DOCUMENTS

| | | | | |
|---|---|---|---|---|
| 3,831,999 A | * | 8/1974 | Sonneborn ................ | 180/89.14 |
| 3,853,368 A | * | 12/1974 | Eichelsheim ............. | 180/89.14 |
| 4,410,056 A | * | 10/1983 | Pound et al. ............ | 180/89.15 |
| 4,440,252 A | * | 4/1984 | Steinecke et al. ........ | 180/89.15 |

(Continued)

FOREIGN PATENT DOCUMENTS

DE    3426828 A1  *  1/1986

(Continued)

OTHER PUBLICATIONS

Patent Abstracts of Japan, vol. 014, nl. 266 (M-0982), Jun. 8, 1990 & JP 02 077373 A (NHK Spring Co Ltd.) Mar. 16, 1990; abstract.

(Continued)

*Primary Examiner*—Paul N. Dickson
*Assistant Examiner*—Laura B. Rosenberg
(74) *Attorney, Agent, or Firm*—Quarles & Brady LLP

(57) ABSTRACT

A hydraulic tilting device for tilting a cab of a vehicle between a driving position and a tilted position, which cab is resiliently supported on the chassis of the vehicle. The tilting device includes a reservoir for hydraulic fluid and a pump which is connected to the reservoir. The tilting device also includes a double-acting hydraulic tilting cylinder for tilting the cab. At the tilting cylinder there is a lost-motion passage which extends between ports which open out into the cylinder space of the tilting cylinder, which ports are respectively in communication with the pressure chamber and the pull chamber of the tilting cylinder if the piston-piston rod assembly is in the lost-motion range defined by the ports. The tilting device is designed in such a manner that the reciprocating movements of the piston-piston rod assembly within the lost-motion range can take place with as little obstacle as possible.

10 Claims, 3 Drawing Sheets

U.S. PATENT DOCUMENTS

Figure 1:
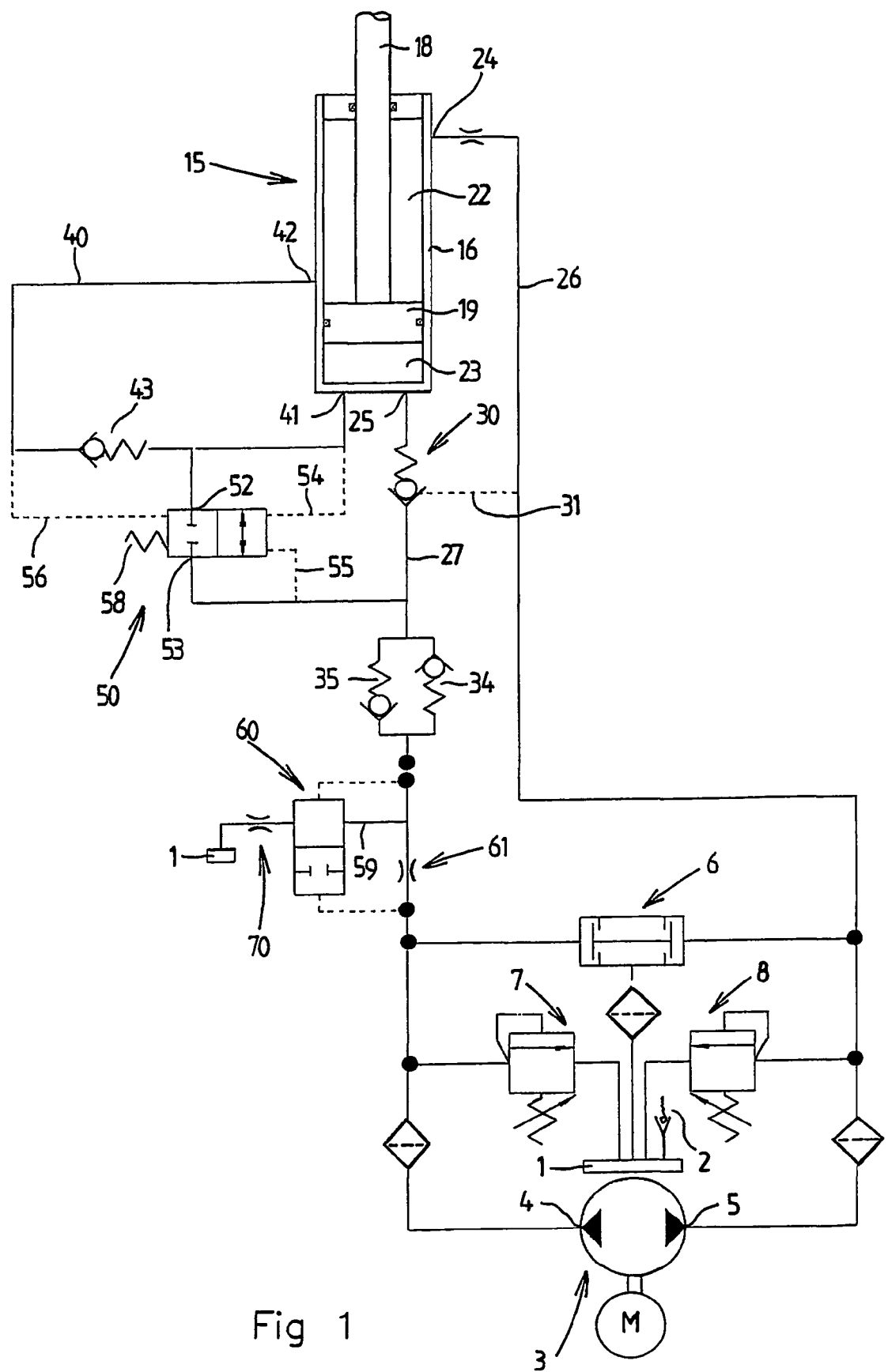

| | | | | |
|---|---|---|---|---|
| 4,442,912 A | * | 4/1984 | Vette | 180/89.15 |
| 4,446,939 A | * | 5/1984 | Oudelaar | 180/89.15 |
| 4,463,818 A | * | 8/1984 | Sonneborn | 180/89.15 |
| 4,483,409 A | * | 11/1984 | Fun | 180/89.15 |
| 4,493,386 A | * | 1/1985 | Sonneborn | 180/89.15 |
| 4,739,854 A | * | 4/1988 | Sabel et al. | 180/89.15 |
| 5,839,278 A | * | 11/1998 | Sonneborn | 60/403 |
| 6,068,074 A | * | 5/2000 | Sonneborn et al. | 180/89.14 |
| 6,145,613 A | * | 11/2000 | Thompson et al. | 180/89.15 |

FOREIGN PATENT DOCUMENTS

| | | |
|---|---|---|
| DE | 197 30 499 | 1/1999 |
| DE | 199 05 512 | 6/2000 |
| EP | 200870 A2 * | 11/1986 |
| JP | 57198175 A * | 12/1982 |
| NL | 1 009 507 | 4/2000 |
| WO | 00/00378 | 1/2000 |

OTHER PUBLICATIONS

International Search Report, Form PCT/ISA/210, as issued by European Patent Office in Connection with PCT Application No. PCT/NL01/00757.

English Language Translation of Search Report issued in Connection with Application No. NL 1016668.

* cited by examiner

HYDRAULIC TILTING DEVICE FOR TILTING A VEHICLE CAB, AND VEHICLE PROVIDED WITH TILTING DEVICE OF THIS TYPE

The present invention relates to a hydraulic tilting device for tilting a cab of a vehicle between a driving position and a tilted position according the the preamble of claim 1.

It is generally known from the prior art for a cab of a vehicle to be tiltably connected to the chassis of the vehicle in order to enable the cab to be tilted between a driving position, in which the vehicle can be driven, and a tilted position, in which, for example, maintenance can be carried out on the engine beneath the cab. Furthermore, it is generally known for a tiltable cab of this type to be spring mounted on the chassis in the driving position, for the comfort of the passengers, in particular the driver, when driving.

To tilt a spring mounted cab of this type, it is known to use a hydraulic tilting device with a tilting cylinder which is arranged between the chassis and the tiltable cab. To prevent the tilting cylinder from interfering with the spring movements of the cab with respect to the chassis which occur when the vehicle is driving, tilting devices with a so-called lost-motion mode are used. These tilting devices can broadly be divided into two types, namely firstly a type with a mechanical lost motion, for example a lost-motion arm, which is generally located pivotably between the tilting cylinder and the cab, or with a type of pin-and-slot connection between the tilting cylinder and the cab, and secondly a type using hydraulic lost motion.

In a tilting device with a hydraulic lost motion, the tilting cylinder has a "lost-motion action". A hydraulic cab tilting device of this type, on which the preamble of claim 1 is based, is known, for example, from NL 1 009 507.

In this publication, it is proposed that, when the vehicle is being driven and the cab is executing sprung movement, the piston/piston rod assembly can move freely in a reciprocating manner, since the piston is situated in a lost-motion range which is defined by the two ports of the lost-motion passage. The pump of the tilting device is deactivated in the lost-motion mode.

It is explained with reference to FIGS. 1 and 2 of NL 1 009 507 that in this known tilting device the reservoir valve is designed as a special slide valve. The aim of this special slide valve is for the up and down movement of the piston/piston rod assembly in the lost-motion mode to be impeded as little as possible by ensuring a connection between the pressure chamber and the reservoir by means of this slide valve, so that the sprung movement of the cab, which is directly connected to the piston/piston rod assembly, is not interfered with.

A drawback of the solution described in NL 1 009 507 is that it cannot be used universally for tilting devices with a lost-motion mode which is brought about by hydraulic means. A further drawback is that an anti-suction device also has to be provided in the reservoir line, although this is not described in NL 1 009 507.

The present invention aims to provide a cab-tilting device with a hydraulic lost-motion action in which it is ensured that the lost-motion action is not adversely affected by an undesirable build-up of pressure in the pressure chamber of the tilting cylinder.

The present invention achieves this object by providing a tilting device according to the preamble of claim 1 which is characterized in that a flow restrictor is incorporated in the said connecting line between the pump and the pressure connection of the tilting cylinder, and in that the reservoir valve—when fluid flows out of the pressure chamber via the pressure connection—opens the reservoir line under the influence of a pressure drop caused by said flow restrictor, and in that the reservoir valve—when fluid flows in the direction from the pump to the pressure chamber—closes the reservoir line under the influence of a pressure drop caused by said flow restrictor.

The use of a reservoir valve which is controlled by the flow of fluid has the result that, when the piston/piston rod assembly is retracted while the cab is being tilted into the driving position, the reservoir valve is already actuated in such a manner that the reservoir line is open. Since there is then no delivery of pressurised fluid by the pump to the pressure chamber for as long as the cab is not tilted again, the open state of the reservoir valve is retained. When driving the vehicle, it is impossible for an undesirably high pressure to build up in the pressure chamber, since the fluid can flow directly to the reservoir. The reservoir valve only closes when the cab is tilted forwards again.

The solution described above can be used universally for hydraulic cab-tilting devices of this type and is easy to implement.

Figure 2:
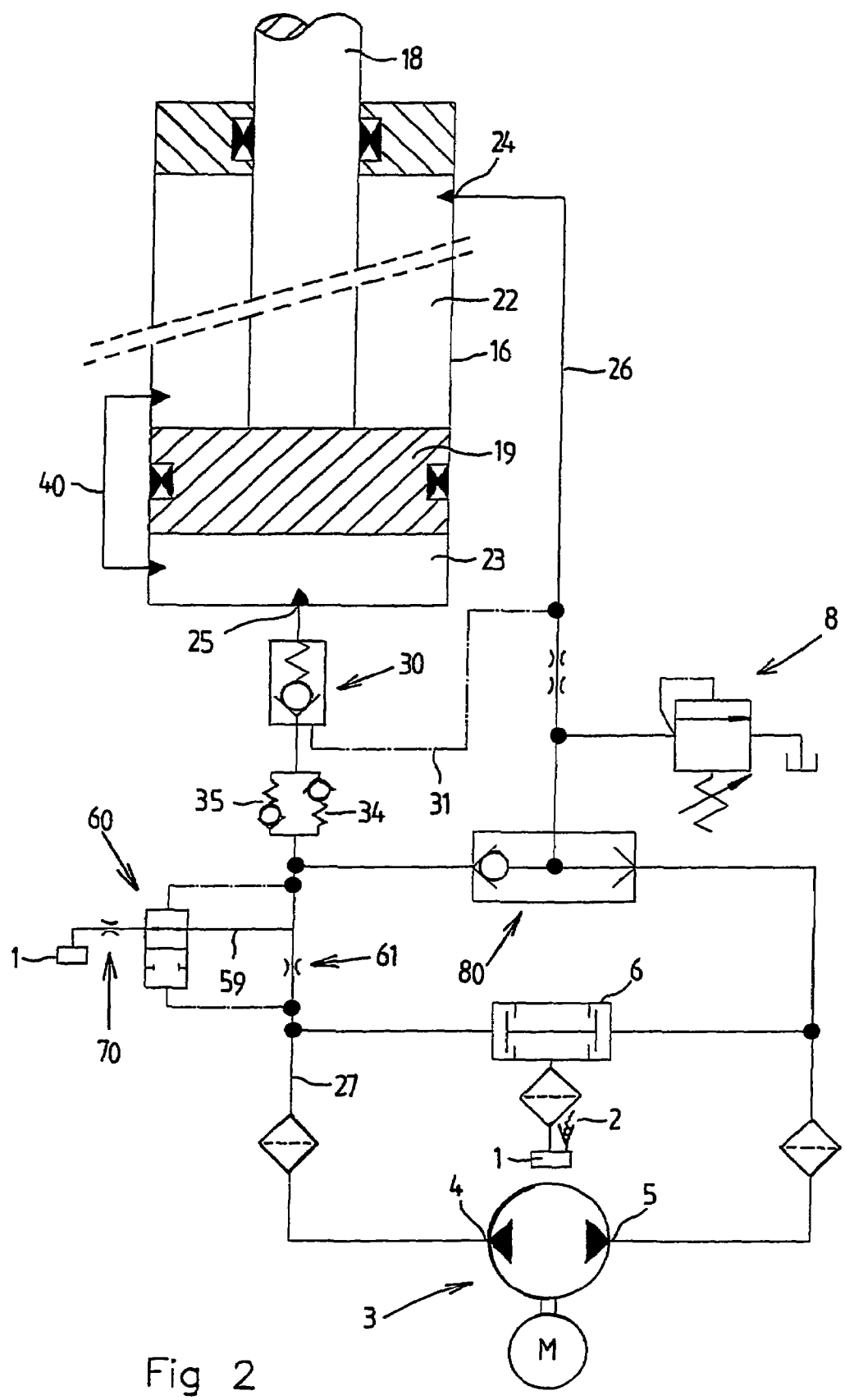
Figure 3:
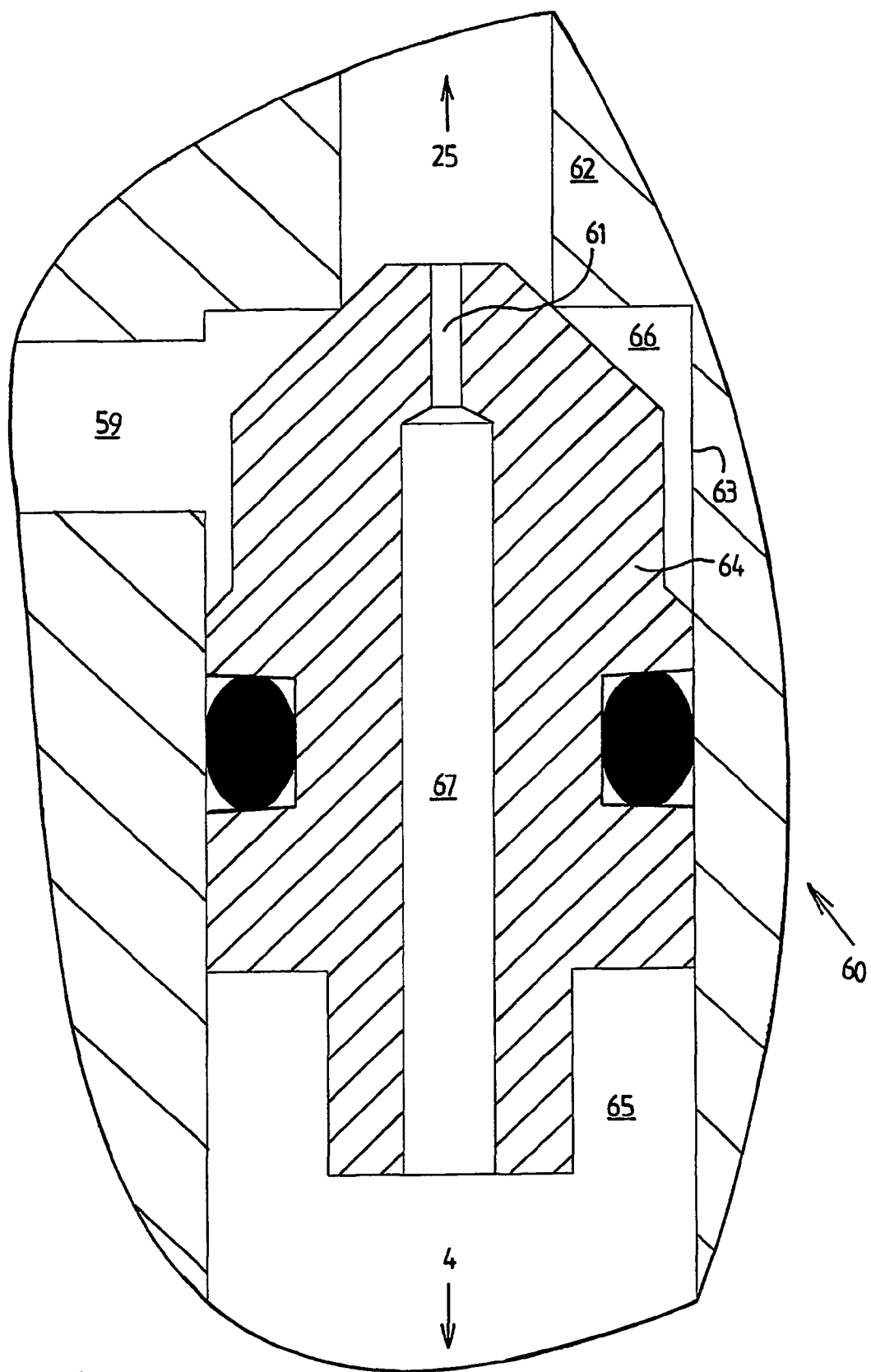

Advantageous embodiments of the tilting device according to the invention will be described below with reference to the drawing, in which:

FIG. 1 shows the hydraulic circuit diagram of an exemplary embodiment of the tilting device according to the invention, FIG. 2 shows the hydraulic circuit diagram of another exemplary embodiment of the tilting device according to the invention, and FIG. 3 shows a preferred embodiment of the reservoir valve in the tilting device according to the invention.

The hydraulic tilting devices according to the invention which are shown in FIGS. 1 and 2 are intended to tilt the driver's cab of a vehicle, in particular of a lorry. Cabs of this type are usually arranged on the chassis of the vehicle and are tiltably connected to the chassis via pivots means. The pivot means are designed in such a way that the cab can tilt between a driving position, in which the vehicle can be driven, and a tilted position, generally tilted forwards, in which, for example, maintenance can be carried out on the vehicle, in particular on the engine of the vehicle which is situated completely or partially beneath the cab.

Furthermore, vehicles of this type are usually provided with resilient cab-support means which support the cab in the driving position, in such a manner that, in the driving position, the cab can spring up and down with respect to the chassis, in order in this way to increase the driver's comfort. The hydraulic tilting device is provided for the purpose of tilting the cab forwards and back again.

The tilting device comprises an airtight reservoir 1 for hydraulic fluid, the interior of the reservoir being sealed off from the outside air. A pressure-relief valve 2 limits the pressure in the reservoir 1 to a pre-determined superatmospheric pressure, for example to a pressure of 1.5 bar above the outside air pressure.

The tilting device shown in FIG. 1 also comprises a pump 3 connected to the reservoir 1.

The pump 3 is an electrically driven pump of the reversible type with two ports 4, 5 which serve as delivery port or suction port depending on the pump direction. The pump ports 4, 5 are in communication with the reservoir 1 via a suction shuttle valve 6. Furthermore, at each pump port 4, 5 there is a pressure-relief valve 7, 8, which pressure-relief valves 7, 8 are set to the maximum permissible hydraulic pressure in the hydraulic circuit.

FIG. 1 also shows a double-acting linear hydraulic tilting cylinder 15 for tilting the vehicle cab (not shown). The cylinder 15 comprises a cylinder housing 16 in which there is a cylinder space in which a piston-piston rod assembly can move in a reciprocating manner. The piston-piston rod assembly comprises a piston 19 and a piston rod 18 which is fixedly connected thereto.

The cylinder 15 is usually arranged between the cab and the chassis of the vehicle, the cylinder housing 16 generally being pivotably connected to the chassis, and the end of the piston 19 being pivotably connected to the cab.

In the cylinder space, the piston/piston rod assembly 18, 19 forms a pull chamber 22, which retracts the piston/piston rod assembly when hydraulic fluid is fed to it, and a pressure chamber 23, which extends the piston/piston rod assembly when hydraulic fluid is fed to it. An associated pull connection 24 and pressure connection 25 are provided for the pull chamber 22 and the pressure chamber 23, respectively.

A first hydraulic connecting line 26 is connected to the pull connection 24, and a second hydraulic connecting line 27 is connected to the pressure connection 25. On the other side the lines 26, 27 are connected to an associated port 4, 5 of the pump 3.

In the second connection line 27, a hydraulically actuated nonreturn valve 30 is incorporated at the pressure connection 25, which valve closes in the direction towards the pump 3 and opens when sufficient hydraulic pressure is present in the control line 31 connected to the line 26.

In the second line 27, a suction-blocking device 34, 35, which prevents unimpeded suction of liquid via the line 27, is incorporated between the nonreturn valve 30 and the connection to the reservoir formed by the shuttle valve 6. This device could, for example, be composed of two nonreturn valves 34, 35 which act in opposite directions and are positioned in parallel, as diagrammatically indicated in the figures. In practice, however, it is possible for an O-ring and a ball, which is pressed through the O-ring under a defined pressure, to be arranged in a bore. When the ball has passed the O-ring, the passage is then open. The rigidity of the O-ring in combination with the dimensions of the O-ring and the ball are the factors which substantially determine the pressure at which the ball passes through the O-ring, in practice, for example, 7 bar at room temperature.

The tilting device also comprises a lost-motion passage 40 with two ports which open out into the cylinder space and are respectively denoted by 41 and 42; the port 41 could coincide with the pressure connection 25 of the cylinder 15.

The lost-motion passage 40 is diagrammatically indicated and may be designed in various ways. For example, it is possible for the lost-motion passage 40 to be formed by a lost-motion line which lies along the outside of the cylinder housing 16. However, it is also conceivable for the lost-motion passage to be arranged in the cylinder housing 16, for example as one or more grooves in the cylinder wall or as a part with a diameter of the cylinder wall which is oversized with respect to the piston 18. In yet another variant, the lost-motion passage 40 is arranged in a pipe which is directed upwards into the cylinder space from the base of the cylinder housing 16.

The lost-motion passage 40 connects the pull chamber 22 to the pressure chamber 23 when the piston 18 is situated between the two ports 41, 42 of the passage 40, which is the case in a position of the piston/piston rod assembly which is associated with the driving position of the cab. When the vehicle is driving, the pump 3 is out of operation and the tilting device functions in its lost-motion mode.

A nonreturn valve 43, which closes in the direction of the port 42, is incorporated in the lost-motion passage 40, which port 42, in the lost-motion mode of the tilting device, opens out into the pull chamber 22.

The hydraulic tilting device which is shown also comprises a hydraulically actuated slide valve 50 of the spring-return two-way/two-position 2/2 type. The valve 50 has a first valve port 52, which is connected to the pressure chamber 23 of the cylinder 15, and a second valve port 53, which is connected to the line 27 between the anti-suction device 34, 35 and the nonreturn valve 30.

The valve 50 has a slide body which is accommodated slideably in its housing and can be hydraulically displaced into the open position under the influence of hydraulic pressure via the control lines 54, 55. In this case, the control line 54 is directly connected to the pressure chamber 23, and the control line 55 is connected to the line 27 on the side of the port 53.

Via control line 56, which is in direct communication with the port 42, a hydraulic pressure can be exerted on the sliding body, pressing the sliding body into the closed position.

The tilting device also comprises a reservoir line 59 which is connected to the second connecting line 27 and leads to the reservoir 1, and an associated reservoir valve 60 for opening and closing the reservoir line 59. The reservoir line 59 is connected to the second connecting line 27 between the pump port 4 and the nonreturn valve 30, in this example between the the anti-suction device 34, 35 and the branch leading to the suction shuttle valve 6.

Furthermore, a flow restrictor 61 is incorporated in the second connecting line 27 between the pump 3 and the pressure connection 25 of the tilting cylinder 15, in this example between the anti-suction device 34, 35 and the branch leading to the suction shuttle valve 6.

The reservoir valve 60 is designed in such a manner that—when fluid flows out of the pressure chamber 23 via the pressure connection 25—the reservoir line 59 opens under the influence of a pressure drop caused by the relevant flow restrictor 61, and such that the reservoir 60—when fluid flows in the direction of the pump 3 towards the pressure chamber 23—closes the reservoir line 59 under the influence of a pressure drop caused by the flow restrictor 61. In this case, the valve 60 is not provided with restoring means, so that the valve 60 retains its most recently adopted position when the flow of fluid through the restrictor 61 drops of.

If the forward tilting of the cab stops and the cab would seek to tilt back towards the driving position under the influence of its own weight, the nonreturn valve 30 closes. If, at the moment of stopping, the piston 19 is situated above the port 42, the valve 50 also remains closed, since the hydraulic pressure in the pressure chamber then acts on the sliding body via the control line 56. Consequently, the piston-piston rod assembly is reliably held in position, which is very important for the safety of people who are moving or located under the cab.

If the cab is to be tilted out of the tilted position into the driving position, i.e. the piston rod 18 is to be retracted, fluid is fed to the pull chamber 22 via delivery port 5. As a result of the pressure in the first line 26, the nonreturn valve 30 opens and fluid can flow out of the pressure chamber 23. If the tilting back is interrupted in a position in which the piston 19 is situated above the port 42, the valve 50 remains closed. The valve 30 also closes, so that the cab then remains stationary.

When the cab is being tilted back, the reservoir valve 60, on account of the flow of fluid through the restrictor 61 and the resulting pressure drop, will open. Consequently, the fluid can flow out of the pressure chamber 23 via the valve 60 to the reservoir 1. The restrictor 70 is provided in order to limit the speed of movement of the cab. Since, after the cab has been tilted back into its driving position, there is no fluid being supplied from the pump 3 to the pressure chamber 23, the reservoir valve 60 remains open.

If, when the vehicle is driving, the cab is moved in such a manner that the piston rod 18 is pressed into the cylinder housing 16, fluid flows out of the pressure chamber 23, via the opening valve 50 and the reservoir valve 60 which has already been opened, to the reservoir 1. In this situation, the valve 50 opens since a hydraulic pressure is exerted on a control-pressure opening surface of the sliding body via the control pressure line 54. At the same time, there is no hydraulic pressure acting on the closing surface of the sliding body. The reservoir valve 60 had already been opened when the cab was tilted into the driving position.

FIG. 2 shows another tilting device, in which components which correspond to the components shown in FIG. 1 are provided with identical reference numerals.

In the tilting device shown in FIG. 2, there is a lost-motion passage 40 without a nonreturn valve or the like, which lost-motion passage 40 could therefore be designed, for example, as a groove in the cylinder wall of the housing 16.

An OR valve 80 is connected to the two ports 4, 5 of the pump 3 and to the first connecting line 26 to the pull chamber 22.

FIG. 3 shows the preferred embodiment of the reservoir valve 60 with restrictor 61 integrated therein.

The figure shows a housing 62, a bore 63 formed in the housing, and a piston 64 which fits into the bore, can slide in a reciprocating manner and divides the bore into two spaces 65, 66.

In the piston 64 there is a passage 67 which is partially designed as a flow restrictor 61. The passage 67 connects the two spaces 65, 66. The bore 65 forms part of the connecting line 27 between the pump 3 and the pressure connection 25 of the tilting cylinder 15, so that one space 65 is in communication with the pump 3 and the other space, in any position of the piston 64, is in communication with the pressure connection 25.

The reservoir line 59 is connected to the bore 65, in such a manner that the piston 64—when fluid flows out of the pressure chamber 23 via the pressure connection 25—adapts a position in which the reservoir line 59 is connected to the bore, and in such a manner that the piston 64—when fluid flows in the direction of the pump 3 towards the pressure chamber 23—adopts a position in which the reservoir line 59 is closed off from the bore.

It can be seen from FIG. 3 that the hydraulic pressure produced by the flow restrictor 61 on the side of the pump port 4 acts on a considerably larger surface of the body 64 than the pressure which is caused by the restrictor 61 on the side of the pressure connection 25 when the valve 60 is closed. The output of the pump 3 supplies sufficient force to close the valve 60. However, when the cab is being tilted into the driving position, it is conceivable that the output of the pump 3 may be insufficient to open the valve 60. Once the piston 19 has passed the port 52 when the cab is being tilted into the driving position, however, the cab enters into a type of free drop and the amount of fluid discharged via the line 27 increases considerably, with the result that the valve 60 opens reliably.

It will be clear to the person skilled in the art that the tilting device described can also be realized in hydraulic tilting devices with a hydraulic circuit diagram which differs in one or more ways. For example, it is conceivable for the valves 30 and 43 to be integrated in the slide valve 50. Furthermore, it is possible to provide a single-acting pump, for example a hand pump.

What is claimed is:

1. An improved tilting device for tilting a cab of a vehicle between a driving position and a tilted position, which cab is resiliently supported on the chassis of the vehicle, which tilting device comprises:
    a reservoir for hydraulic fluid,
    a pump which is connected to the reservoir for delivering pressurized hydraulic fluid,
    a double-acting hydraulic tilting cylinder for tilting the cab, comprising a cylinder housing having a cylinder space in which a piston-piston rod assembly is moveable in a reciprocating manner, which piston-piston rod assembly, in the cylinder space, forms a pull chamber which, when hydraulic fluid is supplied to it, retracts the piston-piston rod assembly, and a pressure chamber which, when hydraulic fluid is supplied to it, extends the piston-piston rod assembly, an associated pull and pressure connection being provided for the pull and pressure chambers, respectively,
    a lost-motion passage, which extends between ports which open out into the cylinder space of the tilting cylinder, also being provided at the tilting cylinder, which ports are respectively in communication with the pressure chamber and the pull chamber if the piston of the piston-piston rod assembly is in a lost-motion range defined by the ports, the piston-piston rod assembly, within the said lost-motion range, being able to move up and down if the cab, which is in its driving position, executes spring movements,
    wherein the tilting device further comprises a system of lines, such that the pull connection and the pressure connection of the tilting cylinder are connectable as desired to the pump or the reservoir, which system of lines comprises at least one connecting line between the pump and the pressure connection of the tilting cylinder, for delivering pressurized liquid by the pump to the pressure connection, a reservoir line leading to the reservoir, which is connected to the relevant connecting line, and an associated reservoir valve for opening and closing the reservoir line being provided,
    wherein the improvement is that a flow restrictor is incorporated in the said connecting line between the pump and the pressure connection of the tilting cylinder, and in that the reservoir valve is designed—when fluid flows out of the pressure chamber via the pressure connection—to open the reservoir line under the influence of a pressure drop caused by said flow restrictor, and in that the reservoir valve is designed—when fluid flows in the direction from the pump to the pressure chamber—to close the reservoir line under the influence of a pressure drop caused by said flow restrictor.

2. Tilting device according to claim 1, in which the reservoir valve comprises a housing, a bore which is formed in the housing, a piston which is slideable in a reciprocating manner in the bore and which divides the bore into two spaces, a passage, which is formed in the piston and which is designed as a flow restrictor, connecting the two spaces, the bore forming part of the said connecting line between the pump and pressure connection of the tilting cylinder, so that one space is in communication with the pump and the other space, in any position of the piston, is in communication with the pressure connection, the reservoir line being connected to the bore in such a manner that the piston—when fluid flows out of the pressure chamber via the pressure connection—adopts a position in which the reservoir line is connected to the bore, and in such a manner that the piston—when fluid flows in the direction from the pump to the pressure chamber—adopts a position in which the reservoir line is sealed off from the bore.

3. Tilting device according to claim 1, in which a flow restrictor is accommodated in the reservoir line between the reservoir valve and the reservoir.

4. Tilting device according to claim 1, in which an anti-suction device is incorporated in the said connecting line between the reservoir valve and the pressure connection of the tilting cylinder.

5. Tilting device according to claim 1, in which a nonreturn valve, which closes in the direction of the pump, is hydraulically actuated and opens at a defined hydraulic pressure at the pull connection of the tilting cylinder, is incorporated in the connecting line between the reservoir valve and the pressure connection.

6. Tilting device according to claim 5, in which a hydraulically actuated slide valve is provided in parallel with the hydraulically actuated nonreturn valve, which slide valve has a first valve port, which is connected to the pressure chamber, a second valve port, which is connected to the connecting line between the hydraulically actuated nonreturn valve and the reservoir valve, and a sliding body, which is displacable between a closed position, in which the first and second valve ports are closed off from one another, and an open position, in which the first and second valve ports are connected to one another.

7. Tilting device according to claim 5, wherein a hydraulically actuated slide valve is provided in parallel with the hydraulically actuated nonreturn valve, which slide valve has a first valve port, which is connected to the pressure chamber, a second valve port, which is connected to the connecting line between the hydraulically actuated nonreturn valve and the reservoir valve, and a sliding body, which is displacable between a closed position, in which the first and second valve ports are closed off from one another, and an open position, in which the first and second valve ports are connected to one another, and wherein the slide valve is provided with a spring means which exerts a load on the sliding body in the direction of its closed position, and the sliding body having an associated opening control surface which, via a control line, is in communication with the pressure chamber and, via a control line, is in communication with the connecting line between the reservoir valve and the second valve port, so that a hydraulic pressure in the pressure chamber or a hydraulic pressure at the second valve port acts on the opening control surface in order to press the sliding body towards the open position, and a closing control surface, which in lost-motion mode is connected via a control line to the pull chamber, so that a hydraulic pressure in the cylinder space acts on the closing control surface for the purpose of pressing the sliding body towards the closed position.

8. Tilting device according to claim 1, in which a valve which is able to close off the lost-motion passage is arranged in the lost-motion passage.

9. Tilting device according to claim 1, wherein a valve which closes in the direction of the pressure chamber towards the pull chamber and which opens under a predetermined opening pressure in the pull chamber is arranged in the lost-motion passage.

10. A tilting device as claimed in claim 1, further comprising a vehicle having a tiltable cab, a chassis and pivot means which connect the cab to the chassis, wherein the cab is tiltable through an angle with respect to the chassis, about a pivot axis which is defined by the pivot means, between a driving position and a tilted position, the cab being resiliently supported on the chassis, and the tilting device is for the purpose of tilting the cab.

* * * * *

UNITED STATES PATENT AND TRADEMARK OFFICE
CERTIFICATE OF CORRECTION

PATENT NO. : 7,055,637 B2
APPLICATION NO. : 10/432447
DATED : June 6, 2006
INVENTOR(S) : Roeland Mallan et al.

It is certified that error appears in the above-identified patent and that said Letters Patent is hereby corrected as shown below:

Column 1, line 8, "position according to the preamble of claim 1" should be --position.--

Column 1, lines 34-35, "type, on which the preamble of claim 1 is based, is" should be --type, is--.

Column 1, starting after line 35, the following should be inserted:
    --In NL 1 009 507 a tilting device is disclosed comprising:
- a reservoir for hydraulic fluid,
- a pump which is connected to the reservoir for delivering pressurized hydraulic fluid,
- a double-acting hydraulic tilting cylinder for tilting the cab, comprising a cylinder housing having a cylinder space in which a piston-piston rod assembly is moveable in a reciprocating manner, which piston-piston rod assembly, in the cylinder space, forms a pull chamber which, when hydraulic fluid is supplied to it, retracts the piston-piston rod assembly, and a pressure chamber which, when hydraulic fluid is supplied to it, extends the piston-piston rod assembly, an associated pull and pressure connection being provided for the pull and pressure chambers, respectively,
a lost-motion passage, which extends between ports which open out into the cylinder space of the tilting cylinder, also being provided at the tilting cylinder, which ports are respectively in communication with the pressure chamber and the pull chamber if the piston of the piston-piston rod assembly is in a lost-motion range defined by the ports, the piston-piston rod assembly, within the said lost-motion range, being able to move up and down if the cab, which is in its driving position, executes spring movements,
-- wherein the tilting device further comprises a system of lines, such that the pull connection and the pressure connection of the tilting cylinder are connectable as desired to the pump or the reservoir, which system of lines comprises at least one connecting line between the pump and the pressure connection of the tilting cylinder, for delivering pressurized liquid by the pump to the pressure connection, a reservoir line leading to the reservoir, which is connected to the relevant connecting line, and an associated reservoir valve for opening and closing the reservoir line being provided.--

Column 1, line 36, "In this publication" should be --In NL 1 009 507--.

Column 1, line 58, the following title should be inserted --OBJECT OF THE INVENTION--.

Column 1, after line 63, the following title should be inserted --SUMMARY OF THE INVENTION--

UNITED STATES PATENT AND TRADEMARK OFFICE
CERTIFICATE OF CORRECTION

PATENT NO. : 7,055,637 B2
APPLICATION NO. : 10/432447
DATED : June 6, 2006
INVENTOR(S) : Roeland Mallan et al.

It is certified that error appears in the above-identified patent and that said Letters Patent is hereby corrected as shown below:

Column 1, lines 64-66, "providing a tilting device according to the preamble of claim 1 which is characterized in that" should be --providing an improved hydraulic tilting device, wherein the improvement is that--

Column 2, line 26, "drawings, in which:" should be --drawing.--

Column 2, after line 26, the following title should be inserted: --BRIEF DESCRIPTION OF THE DRAWINGS--

Column 2 , line 34, the following title should be inserted: --DETAILED DESCRIPTION OF THE PREFERRED EMBODIMENT--

Signed and Sealed this

Twentieth Day of March, 2007

JON W. DUDAS
*Director of the United States Patent and Trademark Office*